Jan. 31, 1961            E. L. FROST            2,970,263
PHASE ANGLE AND POWER FACTOR MEASURING AND INDICATING DEVICES
Filed May 5, 1959            2 Sheets-Sheet 1
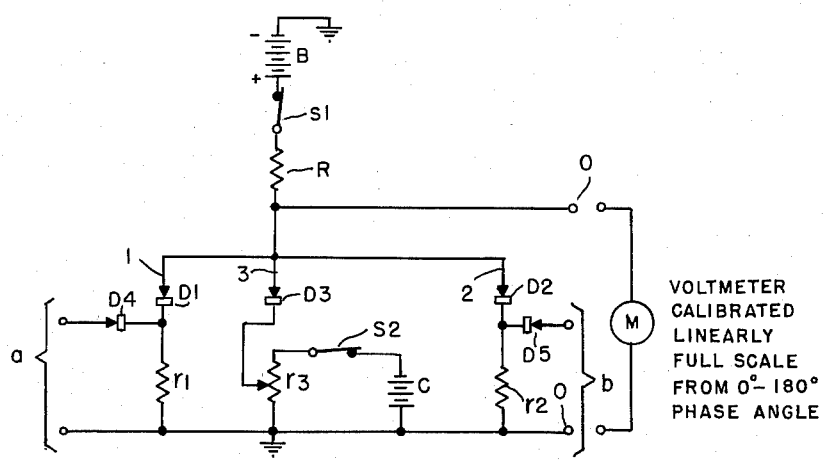
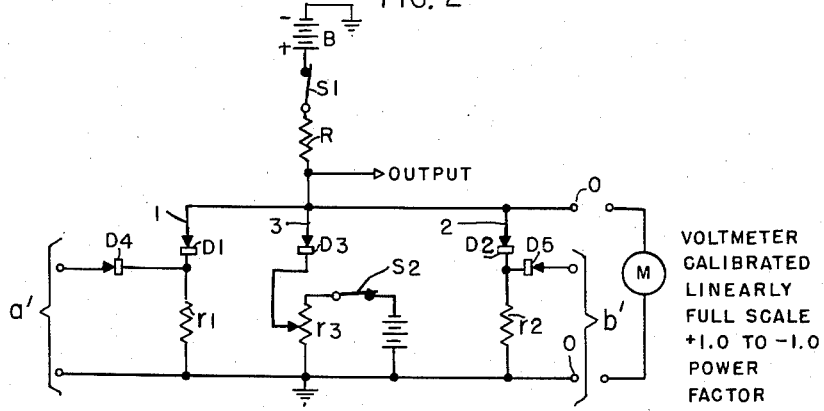
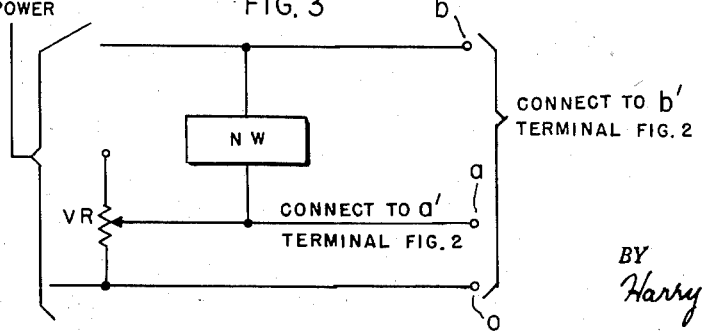
INVENTOR,
EMERSON L FROST
BY
Harry M. Saragovitz
ATTORNEY

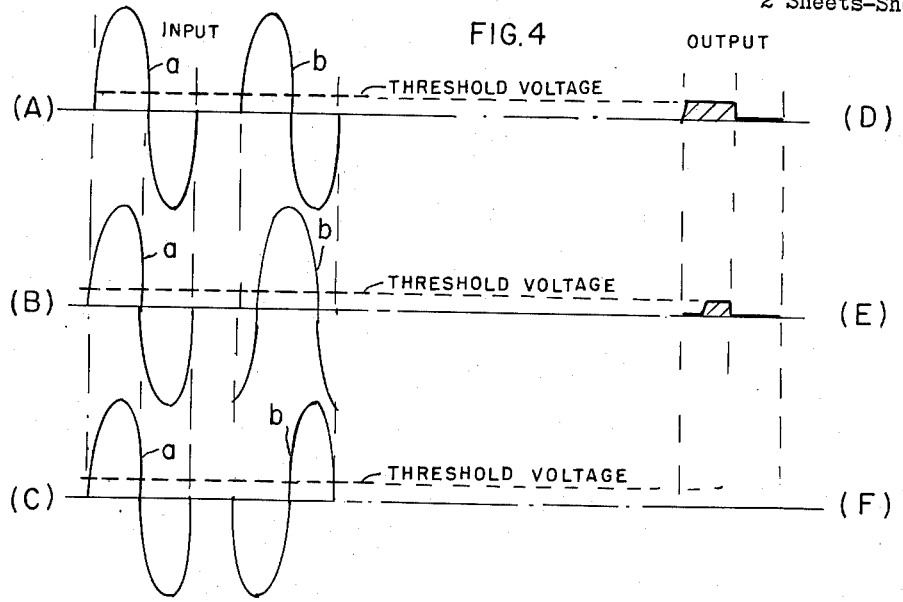
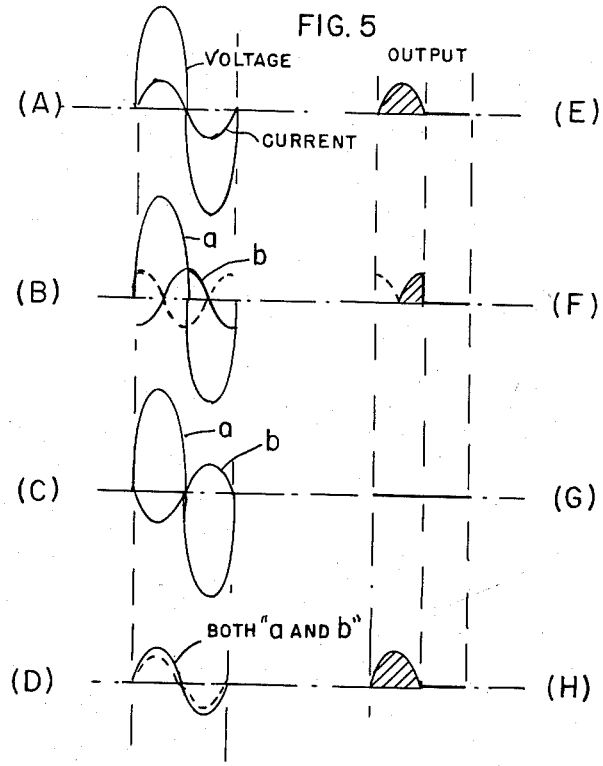

United States Patent Office 2,970,263
Patented Jan. 31, 1961

2,970,263

PHASE ANGLE AND POWER FACTOR MEASURING AND INDICATING DEVICES

Emerson L. Frost, Manasquan, N.J., assignor to the United States of America as represented by the Secretary of the Army Filed May 5, 1959, Ser. No. 811,232

8 Claims. (Cl. 324—87)

(Granted under Title 35, U.S. Code (1952), sec. 266)

The invention described herein may be manufactured and used by or for the Government for governmental purposes, without the payment of any royalty thereon.

The invention relates in general to electrical measuring and indicating devices and particularly to devices for measuring and indicating phase angle and power factor.

In communication or other electrical fields it is often necessary or desirable to obtain directly and quickly an accurate measurement and indication of the phase difference or angle between two electrical signals, such as alternating voltages, or of the power factor of an impedance element or electrical network. The devices in current use for such purposes are unsatisfactory in that they employ relatively complex circuitry and require the use of relatively complex and expensive apparatus elements, such as goniometers, phase shifters or other frequency sensitive networks, amplifiers, transformers, etc.; or the use of mathematical calculations to convert measured data to the desired form.

A general object of the invention is to improve such devices from the standpoint of circuit simplicity, frequency and amplitude insensitivity, economy of apparatus and accuracy of measurement.

A more specific object is to produce directly and economically an accurate measurement and indication of the phase difference or angle between two sinusoidal alternating or pulsating voltages, which are independent of the frequency and the relative amplitude of the two voltages.

Another specific object is to produce directly an accurate measurement and indication of the power factor of an impedance element or electrical network.

The device of the invention is based on the conventional "AND" diode detector circuit of logical networks commonly used in computer technology for other purposes. The basic AND circuit has two or more inputs to each of which a signal of common polarity is applied, and a single output in which a signal appears only if signals are applied simultaneously to all the inputs. The basic circuit is also known as a least voltage coincidence detector circuit, since its output is the same as the smallest instantaneous input and consequently a maximum output is obtained when all the inputs are in phase.

In accordance with the invention, an accurate measurement and indication of phase angle or power factor is obtained electronically with a very simple circuit arrangement comprising the above-referred to conventional AND or least voltage coincidence detector circuit with certain modifications as the measuring circuit, and an inexpensive meter, such as an ordinary D.C. voltmeter, calibrated linearly-full scale in phase angle and or in power factor, for indicating directly the measured output of this circuit arrangement. In the case of the phase angle measuring device, the modification of the AND circuit comprises means for applying a direct current threshold signal to one of the detector branches to make the circuit output insensitive to the amplitude of the input signals applied to the other detector branches, and for meter calibration purposes. In the case of the power factor measuring device, the modification of the AND circuit involves the use of a variable resistor connected in series with the network, the power factor of which is to be determined, across a source of sinusoidal alternating power to provide a voltage in phase with the network current.

The various objects and features of the invention will be better understood from the following detailed description thereof when it is read in conjunction with the several figures of the accompanying drawings, in which:

Fig. 1 is a schematic diagram of the measuring and indicating circuit of the invention, arranged for measuring the phase difference or phase angle between two alternating voltages;

Fig. 2 is a schematic diagram of the measuring and indicating circuit of the invention, arranged for measuring power factor;

Fig. 3 is a schematic diagram of a circuit arrangement which would be used with the measuring and indicating circuit of Fig. 2 when it is employed for measuring the power factor of an electrical network, defined as the cosine of the phase angle between current through a circuit leg of that network and voltage across that leg, for producing a voltage in phase with the current in the electrical network; and Figs. 4(A) to (F) and Figs. 5(A) to (H) show curves used in connection with an explanation of the operation of the circuits of the invention shown in Figs. 1 and 2.

Fig. 1 shows the measuring and indicating device of the invention for measuring and indicating the phase angle between two alternating voltages. It comprises three parallel-connected detector branches 1, 2 and 3 each including a like diode detector and a resistor in series therewith. As shown, the detector branch 1 includes the diode detector D1 and the resistor $r1$ in series therewith, the detector branch 2 includes the diode detector D2 and the series resistor $r2$; and the detector branch 3 includes the diode detector D3 and the series resistor $r3$. The anodes of the diode detectors D1, D2 and D3 are connected through the common series resistor R and switch S1 to the positive terminal of the direct current source B. The cathodes of the diode detectors D1, D2 and D3 are connected through the individual resistors $r1$, $r2$ and $r3$, respectively, and common ground to the negative terminal of the source B. A threshold direct current battery C low in voltage in comparison to that of battery B is connected through series switch S2 across the resistor $r3$ in detector branch 3, and a variable tap on the resistor $r3$ is provided for enabling the threshold voltage in detector branch 3 to be varied within predetermined limits. Two electrical signal voltages $a$ and $b$ of sine wave form and of any frequency and amplitude, the phase angle between which is to be determined, are applied across the resistor $r1$ in detector branch 1 and across the resistor $r2$ in detector branch 2, respectively, through the respective diode rectifiers D4 and D5 utilized to provide a common polarity for the applied waves. Output terminals O are connected across the three detector branches 1, 2 and 3. The circuit constants are selected such that:

$R \gg r1 = r2 \cong r3$
$B + \gg C$
Amplitude peaks of $a$ and $b \gg C$

The threshold voltage provided in detector branch 3 by direct current source C may be tapped down from the source B, if desired. The switches S1 and S2 are provided to allow the associated leads to be opened to reduce battery drain where battery sources are used for B and C.

The combination of the two sine wave inputs and the small D.C. input (threshold voltage) will produce a unipolar output across the output terminals O which is a very good rectangular wave the total area of which varies directly with the phase difference or angle between the applied input waves $a$ and $b$. This measuring circuit output may be indicated in a suitable meter M, such as an ordinary D.C. voltmeter, connected across the terminals O, which meter is calibrated linearly-full scale, say from 0–180° phase angle. The meter M may be so calibrated by applying the same sinusoidal voltage, generally one of the two voltages $a$ or $b$ the phase difference between which is to be determined, to both sets of input terminals, and by adjusting the value of the threshold voltage applied by source C to the detection branch 3 for full scale deflection of the meter M, corresponding to 0° phase difference.

Fig. 4(A) shows the wave forms for the sinusoidal voltage inputs $a$ and $b$ applied to the detector branches 1 and 2, respectively, when they are in phase with each other; Fig. 4(B) shows the $a$ and $b$ sinusoidal inputs in quadrature phase relation; and Fig. 4(C) shows the sinusoidal inputs $a$ and $b$ 180° out of phase. The threshold voltage applied by source C to the detector branch 3 is indicated on each of the curves 4(A) to 4(C) by the horizontal dashed line so labeled. The corresponding outputs appearing across the output terminals O as shown in Figs. 4(D), (E) and (F) are full scale, one-half scale and zero, respectively.

Fig. 2 shows the basic AND diode detector circuit arranged for measuring power factor. It is the same as the phase angle measuring and indicating circuit of Fig. 1 as indicated by the use of the same characters designating its main component elements, except that the meter M, which may be an ordinary D.C. voltmeter, connected across the output terminals O and indicating average D.C. voltage, in addition to the scale indicating phase angle, would have another scale calibrated linearly-full scale, from —1.0 to +1.0 power factor. The same relation between the values of the resistors R, $r1$ and $r2$ as specified above for the phase angle measuring and indicating circuit of Fig. 1 apply to the circuit arrangement of Fig. 2.

Where the circuit of Fig. 2 is to be used for measuring and indicating the power factor of an electrical network or load NW, defined as the cosine of the phase angle between current through a circuit leg of the network and voltage across that circuit leg of the network, as indicated in Fig. 3 a variable resistor VR would be inserted in series with network NW across a source of sinusoidal alternating power to provide a voltage in phase with the network current. The input terminals designated $a'$ connected through rectifier D4 across the resistor $r1$ in detector branch 1 of Fig. 2 also would be connected across the effective resistance of the variable resistor VR (Fig. 3), and the input terminals designated $b'$ connected through rectifier D5 across the resistor $r2$ in detector branch 2 (Fig. 2), also would be connected across the circuit including network NW and the portion of variable resistance VR effectively in series therewith (Fig. 3). The variable resistor VR will of necessity be furnished with the power factor measuring circuit (Fig. 2). Its value will be much less than $r1$ and $r2$ and capable of handling the current through the network NW the power factor of which is to be measured. The peak voltage across VR will be much less than the peak line voltage and much less than the voltage of source B.

The device of Figs. 2 and 3 in combination will operate to indicate the power factor of the network NW only if the value of $r3$ is set high enough so that the threshold voltage in the detector branch 3 will be ineffective, that is, greater than the going peaks across $r1$. The circuit can measure power factor linearly, but not phase angle (linearly) if the detector branch 3 is disconnected from the common connection between D1, D2 and R.

Fundamental wave forms for the power factor measuring and indicating circuit of Fig. 2 in combination with the circuit of Fig. 3, are shown in Figs. 5(A) to (H). Fig. 5(A) shows the phase shift between the voltage and current in the network (load) NW, resulting in Fig. 5(E)) a full-scale output is meter M, or a power factor of +1.0. Fig. 5(B) shows +90° phase shift between voltage and current, resulting (Fig. 5(F)) in a half-scale deflection in the meter M, or a power factor of zero. Fig. 5(C) indicates that the voltage and current in network (load) NW are 180° out of phase resulting (Fig. 5(G)) in a power factor reading of —1.0. Fig. 5(D) shows how calibration is carried out for a particular network (load), where both $a'$ and $b'$ inputs (Fig. 2) are connected across the variable resistor VR (Fig. 3) and VR is adjusted so that maximum deflection is obtained in the meter, to indicate a power factor of +1.0, as shown in Fig. 5(H).

There is an ambiguity existing both in the case of the phase detector and power factor meter (Figs. 1 and 2), since it is not known from the reading of the meter M which of the inputs is leading and which is lagging. This is most important in the case of the measurement of power factor, and in this case it is nearly always known which is leading and which is lagging, that is, whether the load is inductive or capacitive. Contrariwise, many power factor meters in current use do not show if the "load" is actually a load or a source. If the "load" is a source, the power factor meter of the invention will show a negative power factor on the meter scale.

Various modifications of the phase angle and power factor measuring and indicating circuits as described above which are within the spirit and scope of the invention will occur to persons skilled in the art.

What is claimed is:

1. In combination in a circuit for measuring and indicating phase angle or power factor, three parallel-connected branch circuits each including a like diode detector and an individual resistor in series therewith, a common resistor of value large in comparison to each of the individual resistors in said branch circuits, a first source of direct current the positive terminal of which is connected through said common resistor to the anodes of the diode detectors in all of said branch circuits and the negative terminal of which is connected through a common ground and the individual resistor in each of said branch circuits to the cathode of the diode detector therein, two rectifiers, two sets of input terminals respectively connected in series with a different one of said rectifiers across the individual resistor in a different one of two of said branch circuits, means for applying a threshold direct current voltage of adjustable variable value small in comparison to that of said first direct current source to the third one of said branch circuits through the individual resistor therein, a set of output terminals connected across said three branch circuits and a meter connected across said set of output terminals for indicating the average direct current voltage produced in said three branch circuits in response to sinusoidal alternating current signals applied to said two sets of input terminals.

2. The combination circuit of claim 1 utilized for measuring phase difference, in which two alternating signals of sinusoidal waveform the phase difference between which is to be measured, are respectively applied across a different one of said two sets of input terminals, said meter is calibrated linearly-full scale in phase angle from 0 to 180° and said threshold direct current voltage applied to said third branch circuit is adjusted for full scale deflection of said meter when said two alternating signals are in phase, to indicate a phase angle of zero degrees.

3. The combination circuit of claim 1 utilized for measuring the power factor of an electrical network, defined as the cosine of the phase angle between current through a series leg of the network and the voltage across that circuit leg, in which a variable resistor is connected in series with the network across a source of sinusoidal alternating power to provide a voltage in phase with the network current, one of said sets of input terminals is connected across the effective resistance of said variable resistor, the second set of input terminals is connected across the circuit comprising said variable resistor and said network in series, the threshold voltage applied to said third branch circuit is higher than the peak voltage across the individual resistor in one of said branch circuits, and said meter is calibrated linearly-full scale in power factor from +1.0 to −1.0, and said variable resistor is adjusted for maximum deflection of said meter, to indicate a power factor of +1.0.

4. A circuit for measuring and indicating accurately the phase difference between two sinusoidal alternating waves, comprising three parallel-connected branch circuits each including a diode detector having a cathode and an anode, a common resistor, a source of direct current having its positive terminal connected through said common resistor to the anodes of the diode detectors in all of said branch circuits and its negative terminal connected through common ground and each of said branch circuits to the cathode of the diode detector therein, means for impressing portions of said two waves having the same polarity on a different one of two of said branch circuits, means for inserting a threshold direct current voltage of adjustable value low in comparison to that of said direct current source in the third of said branch circuits and a meter for indicating the average direct current voltage produced in all said branch circuits, connected across these circuits, said meter being calibrated linearly-full scale in phase angle from 0 to 180° and said threshold voltage being adjusted for full scale deflection of said meter when said sinusoidal waves are in phase to indicate a phase angle of 0°.

5. A device for accurately measuring and indicating the phase difference between two sinusoidal waves, said device comprising three parallel-connected branch circuits each including a like diode detector having a cathode and an anode, and an individual resistor in series therewith of substantially the same value in all said branch circuits; a common resistor of resistance value large in comparison with that of each of the individual resistors in said branch circuits; a source of direct current having a positive terminal connected through said common resistor to the anodes of all of said diode detectors in parallel and a negative terminal connected through common ground and the individual resistors in all of said branch circuits to the cathodes of the diode detectors therein; individual rectifier means for respectively impressing each of said waves with the same polarity across the individual resistor in a different one of two of said branch circuits; means for inserting in the third one of said branch circuits a threshold direct current voltage of adjustable value low in comparison to that of said source and a meter connected across said three branch circuits for indicating the average direct current voltage produced therein; said meter being calibrated linearly-full scale in phase angle from 0 to 180° and said threshold voltage being adjusted for full scale deflection of said meter when said sinusoidal waves are in phase with each other so as to indicate a phase angle of zero degrees.

6. A device for accurately measuring and indicating the power factor of an electrical network, said device comprising a source of sinusoidal alternating power, a variable resistor connected in series with said network across said source for deriving a voltage in phase with the current in said network, two parallel-connected branch circuits each including a like diode detector having a cathode and an anode, and an individual resistor in series therewith, a common resistor large in comparison with the resistors said two circuits which are made equal, a source of direct current the positive terminal of which is connected through said common resistor to the anodes of the diode detectors in both of said circuits and the negative terminal of which is connected through a common ground and the individual resistors in both of said circuits to the cathodes of the diode detectors therein, individual means for rectifying the voltage produced across said variable resistor and impressing the rectified voltage across the resistor in one of said two branch circuits, individual means for rectifying the voltage produced across said network and said variable resistor in series and impressing this rectified voltage across the resistor in the other of said two branch circuits, and a meter for indicating the average voltage produced in said two branch circuits connected across these circuits, said meter being calibrated linearly-full scale from +1.0 to −1.0 power factor, said variable resistor being adjusted to provide maximum deflection of said meter representing a power factor of +1.0.

7. The device of claim 6, in which said meter is calibrated to a power factor of +1.0 by connecting said variable resistor through the respective individual voltage rectifying means across the resistors in both of said branch circuits.

8. A device adapted for alternately providing an accurate measurement and indication of the phase difference between two sinusoidal alternating waves, or the power factor of an electrical network, defined as the cosine of the phase angle between circuit through a current leg of the network and the voltage across that leg, said device comprising three parallel-connected branch circuits each including a diode detector having a cathode and an anode, an individual resistor in series therewith of substantially the same value in all of said circuits, a common resistor of large value compared to each of said individual resistors, a source of direct current having a positive terminal connected through said common resistor in series to the anodes of the diode detectors in all of said circuits and a negative terminal connected through a common ground and each of the individual resistors in said branch circuits to the cathodes of the diode detectors therein, two sets of input terminals respectively connected through an individual series rectifier across the individual resistor in a different one of two of said branch circuits, means for applying a threshold direct current voltage low in comparison to that of said source to the third of said branch circuits, a meter connected across the three branch circuits, said meter having one scale calibrated linearly-full scale in phase angle from 0 to 180° and a second scale calibrated linearly-full scale in power factor from +1.0 to −1.0, and a variable resistor adapted for connection in series with said network across a source of sinusoidal alternating power to produce a voltage in that resistor in series with the network current; said two sinusoidal waves when the device is being used for measuring and indicating the phase difference therebetween being respectively connected across a different one of said two sets of input terminals and said threshold voltage in said third branch circuit being adjusted for full-scale deflection of said meter when said two sinusoidal waves are in phase with each other so that the meter indicates a phase angle of zero degrees; and when the device is being used for measuring and indicating power factor the value of the resistor in said third branch circuit is made high enough so that the threshold voltage is effectively removed from said third branch circuit, said variable resistor is connected across one of said two sets of input terminals, said network and said variable resistor in series are connected across the other of said two sets of input terminals and said variable resistor is adjusted for maximum deflection of the meter when the meter indicates a power factor of +1.0.

References Cited in the file of this patent

UNITED STATES PATENTS

| | | |
|---|---|---|
| 2,424,131 | Warmick | July 15, 1947 |
| 2,557,729 | Eckert | June 19, 1951 |
| 2,640,939 | Staschover et al. | June 2, 1953 |
| 2,773,982 | Trousdale | Dec. 11, 1956 |